United States Patent [19]

Mantha

[11] 3,840,084
[45] Oct. 8, 1974

[54] ALL TERRAIN KIT FOR SNOWMOBILE

[76] Inventor: Francois J. Mantha, Evain County, Rouin-Noranda, Quebec, Canada

[22] Filed: Dec. 7, 1971

[21] Appl. No.: 205,665

[30] Foreign Application Priority Data
Jan. 29, 1971 Canada .............................. 104058

[52] U.S. Cl. ............. 180/9.38, 180/5 R, 280/150 R
[51] Int. Cl. ...................... B62d 55/02, B62d 11/24
[58] Field of Search .......... 180/5 R, 9.24 R, 9.24 A, 180/9.38; 280/106, 150 C, 150 R

[56] References Cited
UNITED STATES PATENTS

| | | | |
|---|---|---|---|
| 1,247,674 | 11/1917 | Hankinson | 280/150 C |
| 2,441,132 | 5/1948 | Blakey | 280/150 C X |
| 3,552,514 | 1/1971 | Alpers | 180/5 R |
| 3,710,882 | 1/1973 | Marceau | 180/5 R |

FOREIGN PATENTS OR APPLICATIONS

| 1,961,977 | 6/1970 | Germany | 180/5 R |
|---|---|---|---|

OTHER PUBLICATIONS

Astro Mousse–Published for Levesque Inc. Kamouraska, Quebec, Canada.
Wunder Wheels–Advertising brochure of Forward Ideas Limited–Tillsonburg, Ontario, Canada.

Primary Examiner—Richard J. Johnson
Attorney, Agent, or Firm—Cushman, Darby & Cushman

[57] ABSTRACT

This invention relates to a kit to adapt a snowmobile for all terrain use, wherein the skis, ski supporting frame and hood, are removed from the snowmobile and a frame wider than the frame of the snowmobile is fastened to the forward portion of the frame of the snowmobile, said frame supporting wheel and steering control members, the wheel and steering control members being connected to the steering plate of the snowmobile.

1 Claim, 6 Drawing Figures

PATENTED OCT 8 1974　　3,840,084

ALL TERRAIN KIT FOR SNOWMOBILE

This invention relates to a kit to adapt a snowmobile for all terrain use. The invention is also directed to an all terrain vehicle comprised of a snowmobile from which the skis, ski frame supporting means and hood have been removed and a wide frame, wheels and steering control means added.

A number of means have been used to adapt snowmobiles for use during the summer. There exists arrangements whereby holes are provided in the skis in which wheels may be fitted so that the snowmobile can be used on both snow and land. Other arrangements provide for apparatus in which skis are supported on one end of a frame member such that when the frame member is turned from one position to another the vehicle can be used on snow or as a ground vehicle. Other arrangements include the extension of the axis supporting the skis on which small wheels are placed on the outside of each ski to provide for the use of the snowmobile on land.

Most of the snowmobiles adapted for use on ground as described above can only be used on highways or roads with little or no obstructions. The size of the wheel used in most of these vehicles would not enable the vehicles to be used in rough terrain as there is not sufficient clearance provided by the wheels or the front of the vehicle to ride over brush, rocks and rugged ground.

One embodiment of the invention involves a kit to adapt a snowmobile from which skis, ski frame supports and the hood have been removed for all terrain use comprising a frame member adapted to be fastened to the snowmobile frame by fastening means, large wheels connected to said wheels.

Another embodiment of the invention involves a kit to adapt a snowmobile for all terrain use comprising a frame member adapted to be connected to the snowmobile frame by bolts insertable in the aperatures in the frame from which the skis have been removed, large wheels connected to said frame, said frame adapted when connected to the snowmobile frame to support said wheels on a wider axis than the axis of the snowmobile frame, and steering means connected to said wheels.

Another embodiment of the invention includes a kit to adapt a snowmobile for all terrain use comprising a frame member adapted to be connected to the snowmobile frame by bolts insertable in the apertures in the frame from which the skis have been removed, large wheels connected to said frame, said frame adapted when connected to the snowmobile frame to support said wheels on a wider axis than the axis of the snowmobile frame wherein the steering mechanism consists of a sterring rod, steering and wheel control plate, said steering mechanism is adapted to fit into the existing steering plate and connected steering controls of the snowmobile.

And another embodiment of the invention includes an all terrain vehicle composed of a snowmobile from which the skis, ski frames, and hood have been removed and a frame member fastened by fastening means into the apertures in the frame of the snowmobile from which the skis have been removed, large wheels connected to said frame, the width of said frame being greater than the width of the frame of the snowmobile, and steering means connected to said wheels.

Figure 1:
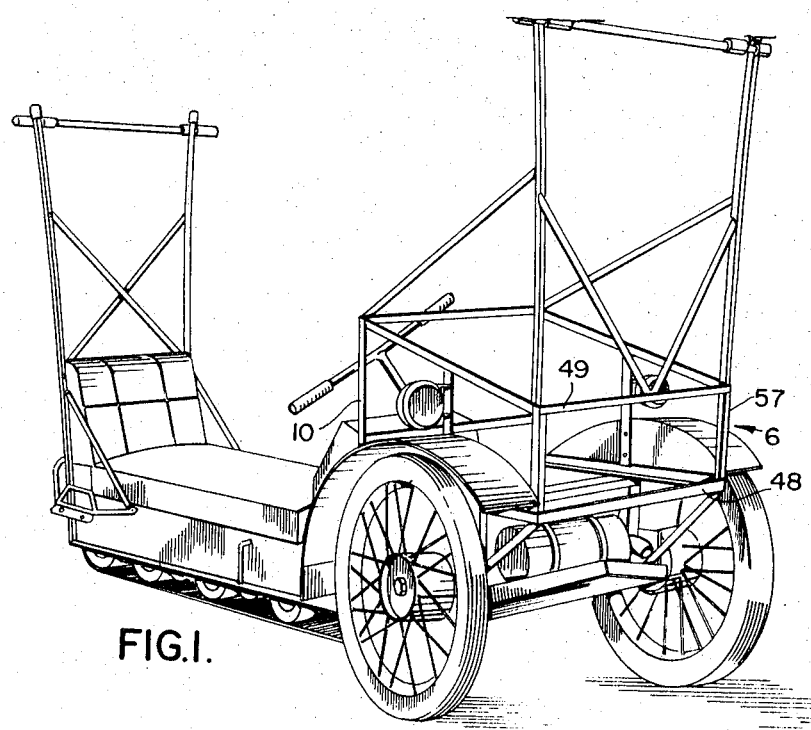
FIG. 1 is a perspective view of the all terrain kit connected to a snowmobile.
Figure 2:
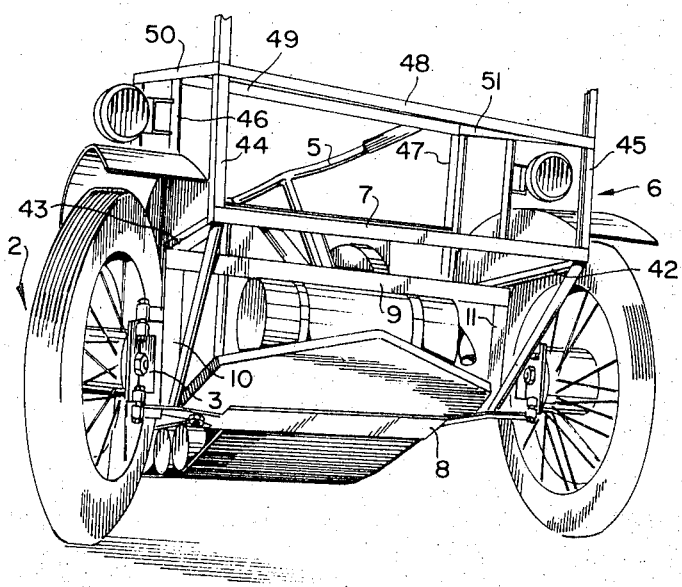
FIG. 2 is a front perspective view of the all terrain kit applied to a snowmobile.

Referring to FIG. 1 and 2 of the drawings the kit is comprised of a frame 1, wheels 2 attached to wheel and steering control plate 3, steering mechanism, 4, connecting a steering handle 5 to the wheel and steering control plate 3, and basket frame 6 including as a part thereof bumper 7.

Figure 3:
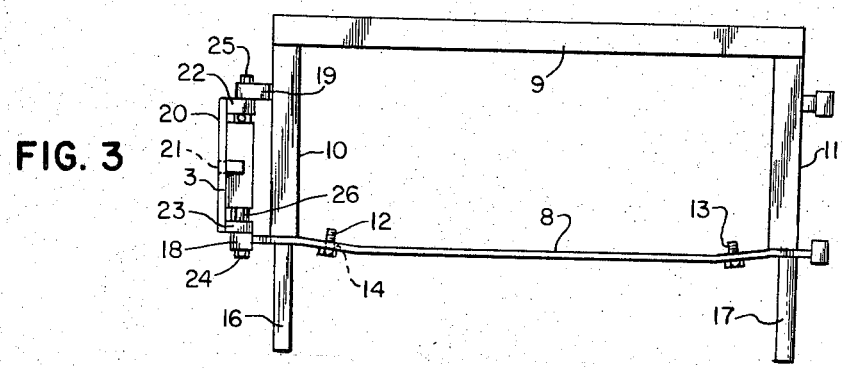
FIG. 3 is a front elevation drawing of the frame of the all terrain kit.

Referring to FIG. 3 the frame 1 is comprised of a parallel lower frame member 8 and upper frame member 9 which are electrically welded to side frame members 10 and 11. The frame 1 is adapted in one embodiment of the invention to be connected to the snowmobile frame by bolts 12 and 13 which fit through holes 14 and 15 in lower frame 8 which holes correspond with holes in the frame member of the snowmobile through which the skis are normally attached to the snowmobile. Bolts 12 and 13 fasten frame 1 to the frame of the snowmobile through the holes from which the skis have been removed. An additional support is provided to the frame 1 by support members 16 and 17 which run from the top frame member 9 respectively to each side frame member of the snowmobile to which the frame is being attached.

Attached to each side of the frame 1 on sides 10 and 11 respectively is the wheel and steering control plate 3. Referring to the arrangement on side 10 which is the same as the arrangement on the side 11 of the frame, side 10 has extending therefrom king pin bushings 18 and 19. Wheel and steering control plate 3 consists of a rectangular member 20 containing axle housing 21 and king pin bushings 22 and 23 designed to fit with king pin bushings 18 and 19 of side frame member 10. King pins 24 and 25 fit through king pin bushings 18 and 23 and 19 and 22 respectively. King pin 24 is retained in position by bolt 26 and king pin 25 is retained in position by bolt 27. The wheel 2 is connected to wheel and steering control plate 12 through axle housing 21 in the usual manner.

Figure 4:
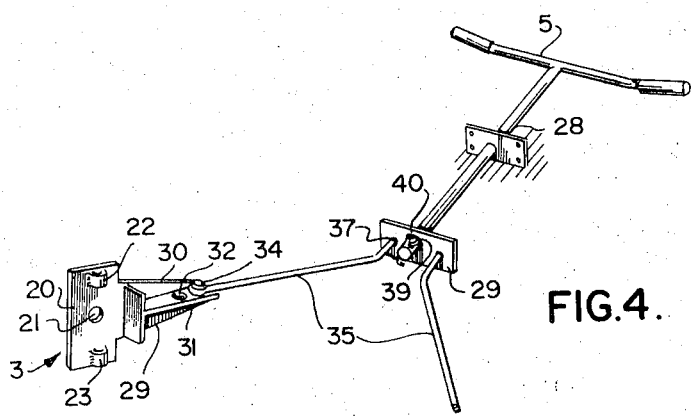
FIG. 4 is a drawing of the steering mechanism for the all terrain kit.

Referring to FIG. 4 the steering is composed of wheel and steering control plate 3, steering rod 28, steering plate 29 and handle 5. Looking at wheel and steering control plate 3 from a point on the imaginary axis between opposing steering control plates on either side of the kit of the all terrain vehicle the steering control plate 3 contains the axle housing 21 and king pin bushings 22 and 23. A strengthening plate 30 extends integrally rearwardly rectangular member 20 of wheel and steering control plate 3. Steering control plate 31 is also rearwardly disposed but perpendicular to strengthening plate 30. Steering control plate 31 contains two holes 32 and 33. Hole 32 is provided to receive a locking pin connected to a rod which is attached to the frame to maintain the wheels parallel to the sides of the frame of the snowmobile during transportation. Hole 33 in control plate 31 receives the pin 34 on one end of steering rod 28. The opposing end of steering rod 28 contains pin 36 which fits in hole 37 in steering plate 29. Handle 5 of the snowmobile connects directly to steering plate 29 and pin 39 at the base of handle 5 is retained in hole 40 in steering plate 29 and turns the steering plate and its associated steering rods and wheels corresponding to the movement of handle 5.

Figure 5:
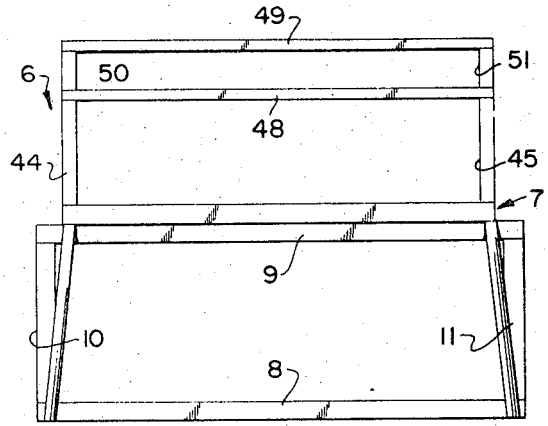
FIG. 5 is a front elevation view of the bumper and basket frame connected to the main frame of the all terrain kit.

Referring to FIG. 5 frame 1 composed of bottom frame member 8, top frame member 9 and side frame members 10 and 11 are shown. The basket 6 is composed of a forward bumper 7 which protrudes in advance of frame member 4. The bumper 7 is connected to the rear bottom member 41 of the basket 6 by parallel bottom side members 42 and 43. The side members 42 and 43 of basket 6 are electrically welded to top frame member 9 where they pass over the top frame member 9. Four corner members 44, 45, 46 and 47 extend upwardly from the base members of basket 6. The front corner members 44 and 45 are shorter than the rear corner members 46 and 47. The top of the basket is formed by longitudinal members 48 and 49 and lateral members 50 and 51, all electrically welded together and to their respective corner members. Because the corner members 44 and 45 are shorter than the corner members 46 and 47 the top of the basket 6 forms a forwardly inclined plane.

Figure 6:
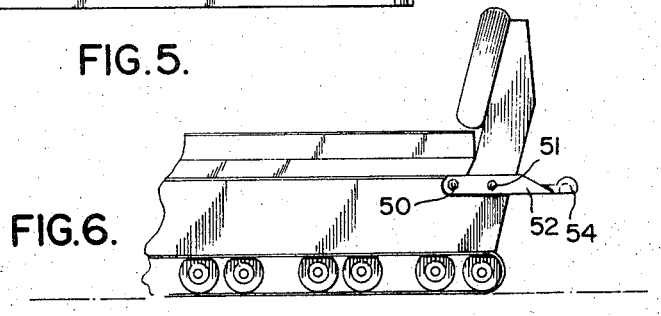
FIG. 6 is a side elevation view of the rear of the all terrain vehicle showing the frame and fastening means attached to the frame of the snowmobile used for lifting and towing the snowmobile on the front wheels of the all terrain kit.

FIG. 6 is a view of the rear end of a snowmobile. Attached to the side of the rear of the snowmobile by bolts 50 and 51 is a structural member 52. A similar structural member 53 is fastened to the opposite side of the snowmobile. The extending portions of the structural members 52 and 53 are connected by a member extending the width of the back of the snowmobile containing a trailer clasp 54.

The kit for the all terrain vehicle is fastened to the snowmobile after the skis, ski frame, ski frame retaining means and steering rod connecting the skis to the steering plate have been removed from the snowmobile. Further, the hood or cabin which surrounds the snowmobile motor is likewise removed before application of the kit for the all terrain vehicle is commenced. Following the removal from the snowmobile of the above-noted materials the frame of the all terrain vehicle is placed under the frame of the forward part of the snowmobile to which the skis were formerly attached. The holes 14 and 15 in lower frame member 8 are aligned with the holes from which the skis were removed and bolts 12 and 13 are placed through the holes 14 and 15 and corresponding holes in the frame of the snowmobile. Respective nuts are then applied to the bolts 12 and 13 and frame 1 is securely attached to the frame of the snowmobile. The wheels 2 attached to wheel and steering control plate 3 are then attached by their respective king pins to king pin bushings 18 and 19 of frame member 10, and the wheels 2 and wheel and steering control plate 3 are likewise connected to their respective king pin bushings of side 11. The ends of steering rod 35 and the end of the corresponding steering rod 35 on the other side of the all terrain vehicle are connected to their respective aperatures in the steering plate 29 and tightened and the all terrain vehicle is ready for use.

No mention has been made herein of the fenders which are attached to the frame 6 of the basket by bolting as well as headlights which are applied to the corner members of the frame of the basket. The basket frame 6 is adapted to receive a basket made of fiberglass or like material. If desirable a reinforcing pan can be attached to the bottom frame member 9 below the frame member 9 of the snowmobile to provide strength and protect the frame member of the snowmobile and generally act as lead-in for the belt of the snowmobile when approaching high objects. If desired the basket frame 6 need not be completed. However, to provide protection to the driver the lower front member of the basket frame 7 which protrudes in front of frame member 1 should be provided. This bumper 7 can be welded to the top of frame member 1 as well as being supported by structural members connected to the lower ends of side members 10 and 11 near their point of juncture with lower member 8 of frame 1.

It is not necessary to have a trailer to move the all terrain vehicle. Rods having pins at one end may be connected into the hole 32 in control plate 31 of wheel and steering plate 3 and the other end of the rod connected to an appropriate member of the frame of the all terrain vehicle to hold the wheels 3 parallel to the longitudinal axis of the all terrain vehicle. The rear end of the all terrain vehicle is then lifted and trailer fastener 54 is placed over the appropriate fastening means on a motive vehicle and the all terrain vehicle is then towed behind the motive vehicle.

I claim:

1. An all terrain vehicle composed of a snowmobile having a frame, a driving track motor and seat fastened to said frame, skis, ski frame supports, hood, and steering connections between the steering plate and skis having been removed, a wheel supporting frame member fastened directly against the snowmobile frame, large wheels connected to the wheel supporting frame, the width of the wheel supporting frame being greater than the width of the frame of the snowmobile, and a steering mechanism connected at one end to the wheel supporting frame member and at the other end to the existing steering plate and steering controls of the snowmobile; a bumper frame being attached to the wheel supporting frame member and extending forward of the wheel supporting frame member, the forward end of the bumper frame being supported by a support member extending from the wheel supporting frame member to the bumper.

* * * * *